(12) United States Patent
Agarwal et al.

(10) Patent No.: US 8,244,638 B2
(45) Date of Patent: Aug. 14, 2012

(54) AUTOMATIC IMAGE ANALYSIS AND CAPTURE

(75) Inventors: Zhongmin Agarwal, Charlotte, NC (US); Hitesh Bajaj, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 13/005,331

(22) Filed: Jan. 12, 2011

(65) Prior Publication Data

US 2012/0179609 A1 Jul. 12, 2012

(51) Int. Cl.
*G06Q 40/00* (2006.01)

(52) U.S. Cl. .......................................... 705/44; 705/39
(58) Field of Classification Search ............... 705/10–44
See application file for complete search history.

(56) References Cited

U.S. PATENT DOCUMENTS

| | | | | |
|---|---|---|---|---|
| 5,940,844 | A * | 8/1999 | Cahill et al. ................... | 715/268 |
| 6,991,158 | B2 * | 1/2006 | Munte ........................... | 235/379 |
| 7,812,986 | B2 * | 10/2010 | Graham et al. .............. | 358/1.15 |
| 7,953,441 | B2 * | 5/2011 | Lors ............................. | 455/557 |
| 2002/0152166 | A1 | 10/2002 | Dutta et al. | |
| 2009/0185241 | A1 | 7/2009 | Nepomniachtchi | |
| 2009/0185736 | A1 | 7/2009 | Nepomniachtchi | |
| 2009/0185737 | A1 | 7/2009 | Nepomniachtchi | |
| 2009/0185738 | A1 | 7/2009 | Nepomniachtchi | |
| 2010/0150424 | A1 | 6/2010 | Nepomniachtchi et al. | |

OTHER PUBLICATIONS

U.S. Appl. No. 12/846,208, Huff et al.
U.S. Appl. No. 12/846,231, Huff et al.
U.S. Appl. No. 12/846,250, Huff et al.
USAA Deposit@Mobile iPhone App USAA (https://www.usaa.com), downloaded Sep. 2, 2010.

* cited by examiner

*Primary Examiner* — Frantzy Poinvil
(74) *Attorney, Agent, or Firm* — Esther F. Queen; Moore & Van Allen

(57) ABSTRACT

In general terms, some embodiments of the present invention relate to methods and apparatuses for automatically analyzing and/or capturing an image of a deposit item for use in a deposit transaction. In some embodiments, a method is provided that includes: (a) generating, by a remote capture device, an image of a deposit item, where the generating the image is based at least partially on the deposit item being exposed to the remote capture device; (b) determining, automatically by the remote capture device, that the image is satisfactory for reading deposit item information from the image, where the deposit item information is associated with the deposit item; and (c) performing, automatically by the remote capture device, a predetermined action, where the performing the predetermined action is based at least partially on the determining that the image is satisfactory for reading deposit item information from the image. In some embodiments, the performing the predetermined action includes capturing, automatically by the remote capture device, the image of the deposit item. In other embodiments, the performing the predetermined action includes prompting, automatically by the remote capture device, a user of the remote capture device to capture the image. In some embodiments, the method occurs in substantially real-time and/or while the deposit item is being exposed to the remote capture device.

34 Claims, 6 Drawing Sheets

AUTOMATIC IMAGE ANALYSIS AND CAPTURE

BACKGROUND

Today, most financial institutions require their customers to visit traditional deposit locations, such as banking centers, automated teller machines (ATMs), and the like, in order to deposit checks, money orders, and/or other deposit items. However, traveling to and from a traditional deposit location in order to make a deposit is increasingly viewed by financial institution customers as burdensome, time-consuming, and wasteful. Thus, there is a need to provide methods and apparatuses that enable financial institution customers to engage in deposit transactions in ways that are easier, more efficient, and less costly than the ways disclosed in the prior art.

SUMMARY OF SELECTED EMBODIMENTS OF THE PRESENT INVENTION

In general terms, various embodiments of the present invention are directed to using a remote capture device (e.g., mobile phone having a digital camera, flatbed scanner, etc.) to engage in a deposit transaction without having to travel to a traditional deposit location (e.g., banking center, ATM, etc.). For example, some embodiments of the present invention provide a method that includes: (a) generating, by a remote capture device, an image of a deposit item, where the generating the image is based at least partially on the deposit item being exposed to the remote capture device; (b) determining, automatically by the remote capture device, that the image is satisfactory for reading deposit item information from the image, where the deposit item information is associated with the deposit item; and (c) performing, automatically by the remote capture device, a predetermined action, where the performing the predetermined action is based at least partially on the determining that the image is satisfactory for reading deposit item information from the image.

As another example, some embodiments of the present invention provide an apparatus that includes: (a) an image capture device configured to generate an image of a deposit item, where the image capture device generating the image is based at least partially on the deposit item being exposed to the image capture device; and (b) a processor operatively connected to the image capture device and configured to: (i) receive the image; (ii) automatically determine that the image is satisfactory for reading deposit item information from the image, where the deposit item information is associated with the deposit item; and (iii) automatically perform a predetermined action, where the processor automatically performing the predetermined action is based at least partially on the processor determining that the image is satisfactory for reading deposit item information from the image.

As still another example, some embodiments of the present invention provide a computer program product having a non-transitory computer-readable medium. In some embodiments, the non-transitory computer-readable medium includes one or more computer-executable program code portions that, when executed by a remote capture device, cause the remote capture device to: (a) generate an image that of a deposit item, where the remote capture device generates the image based at least partially on the deposit item being exposed to the remote capture device; (b) automatically determine that the image is satisfactory for reading deposit item information from the image, where the deposit item information is associated with the deposit item; and (c) automatically perform a predetermined action, where the remote capture device performing the predetermined action is based at least partially on the remote capture device determining that the image is satisfactory for reading deposit item information from the image.

As another example, some embodiments of the present invention provide a method that includes: (a) generating, by a remote capture device, an image of a deposit item, where the generating the image is based at least partially on the deposit item being exposed to the remote capture device; (b) determining, automatically by the remote capture device, that the image is not satisfactory for reading deposit item information from the image, where the deposit item information is associated with the deposit item; and (c) performing, automatically by the remote capture device, a predetermined action, where the performing the predetermined action is based at least partially on the determining that the image is not satisfactory for reading deposit item information from the image.

BRIEF DESCRIPTION OF THE DRAWINGS

Figure 1:
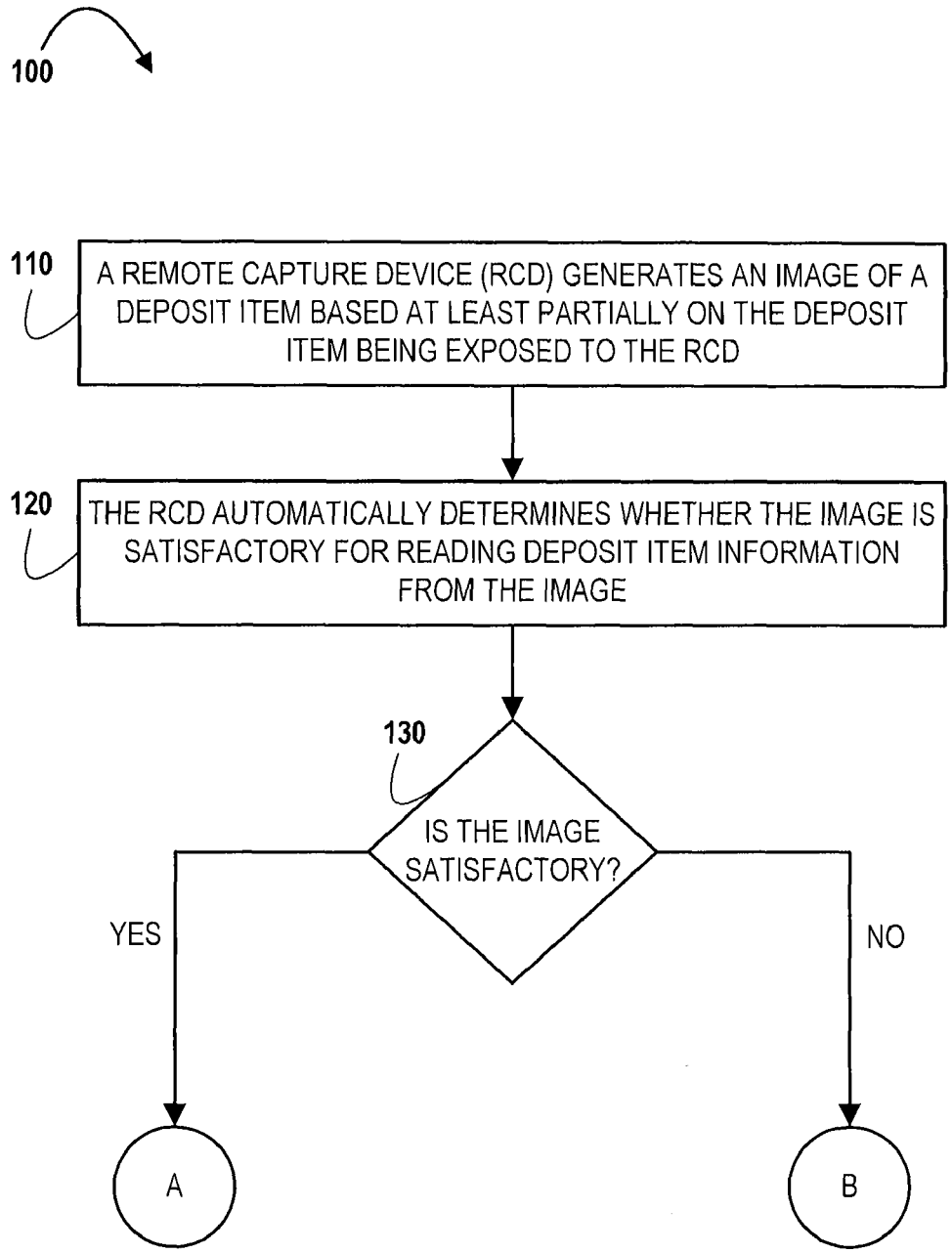
Figure 2:
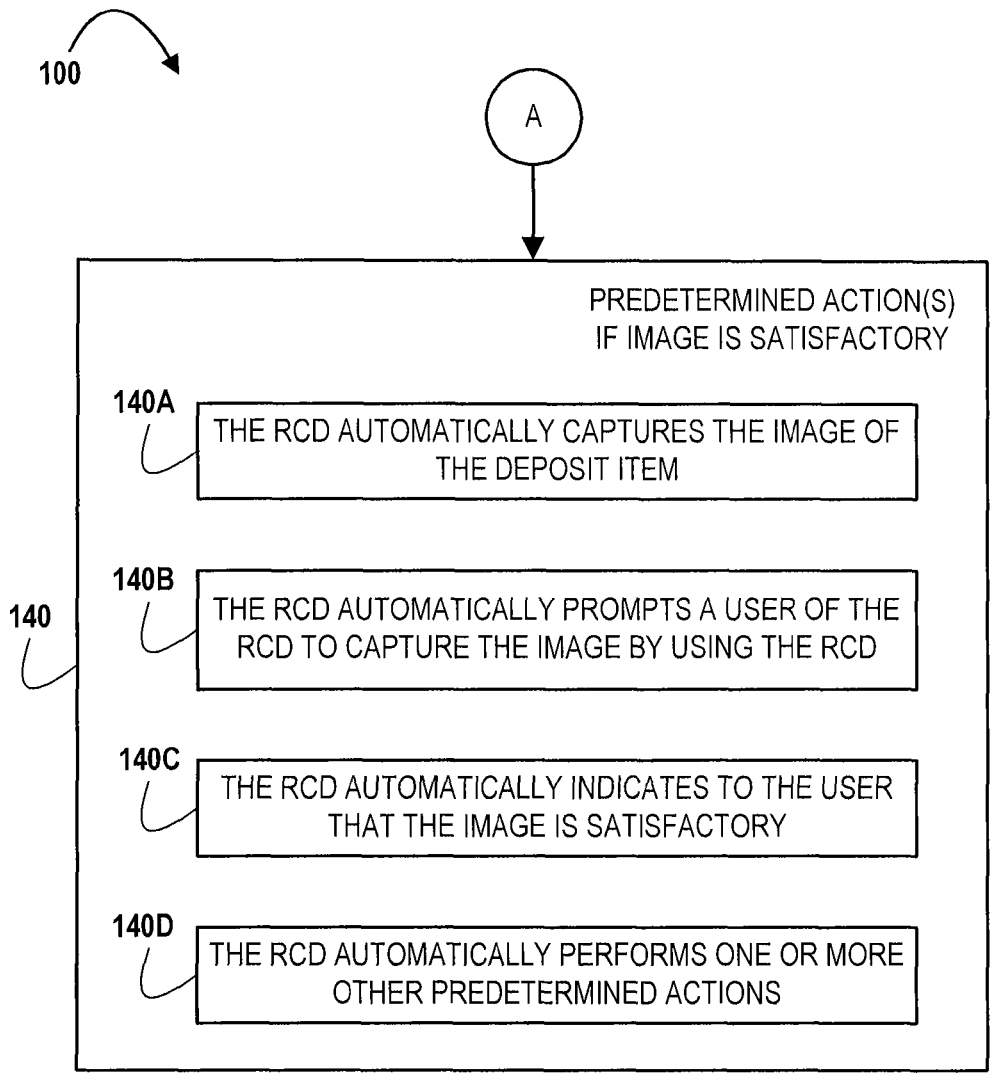
Figure 3:
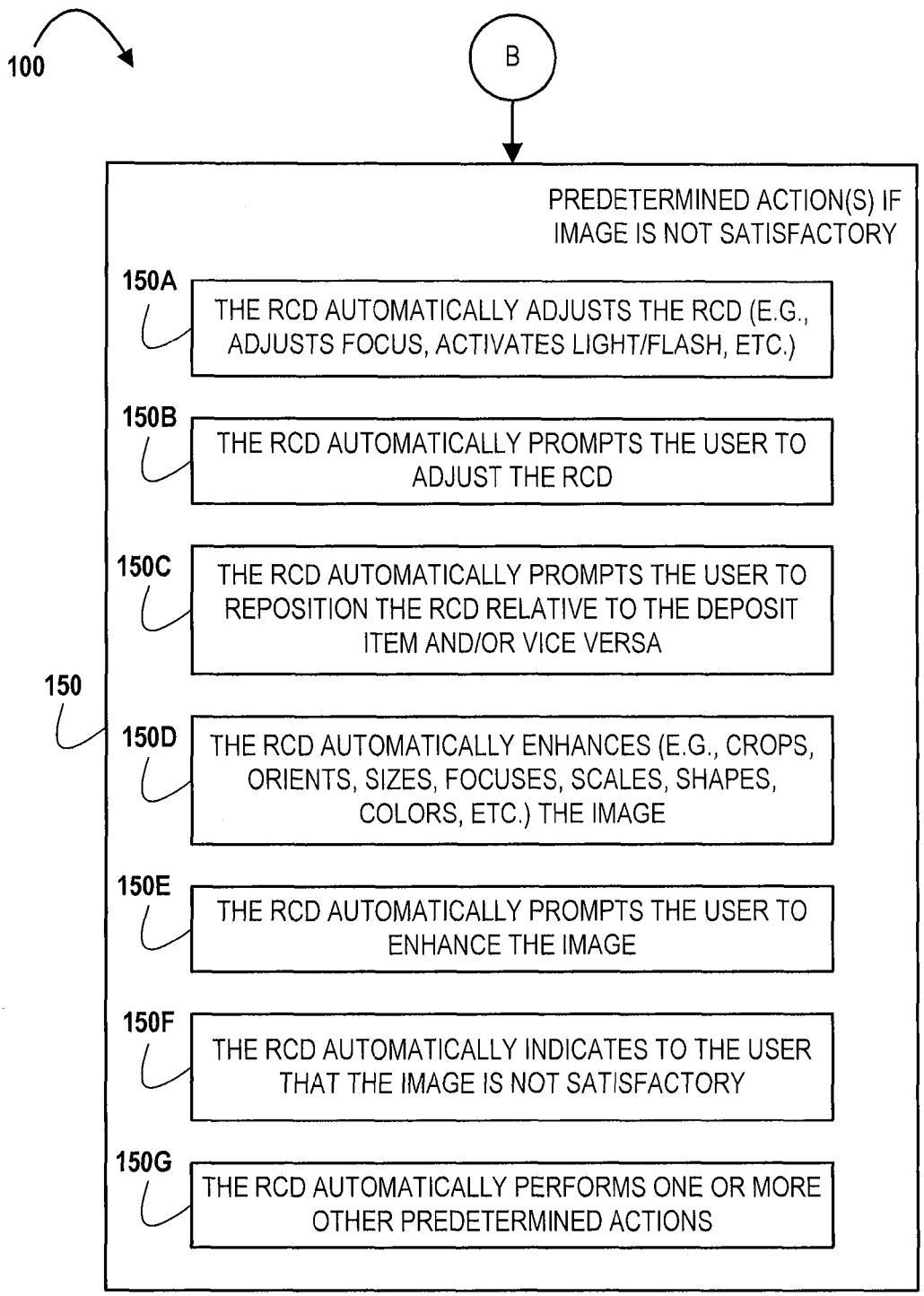
Figure 4:
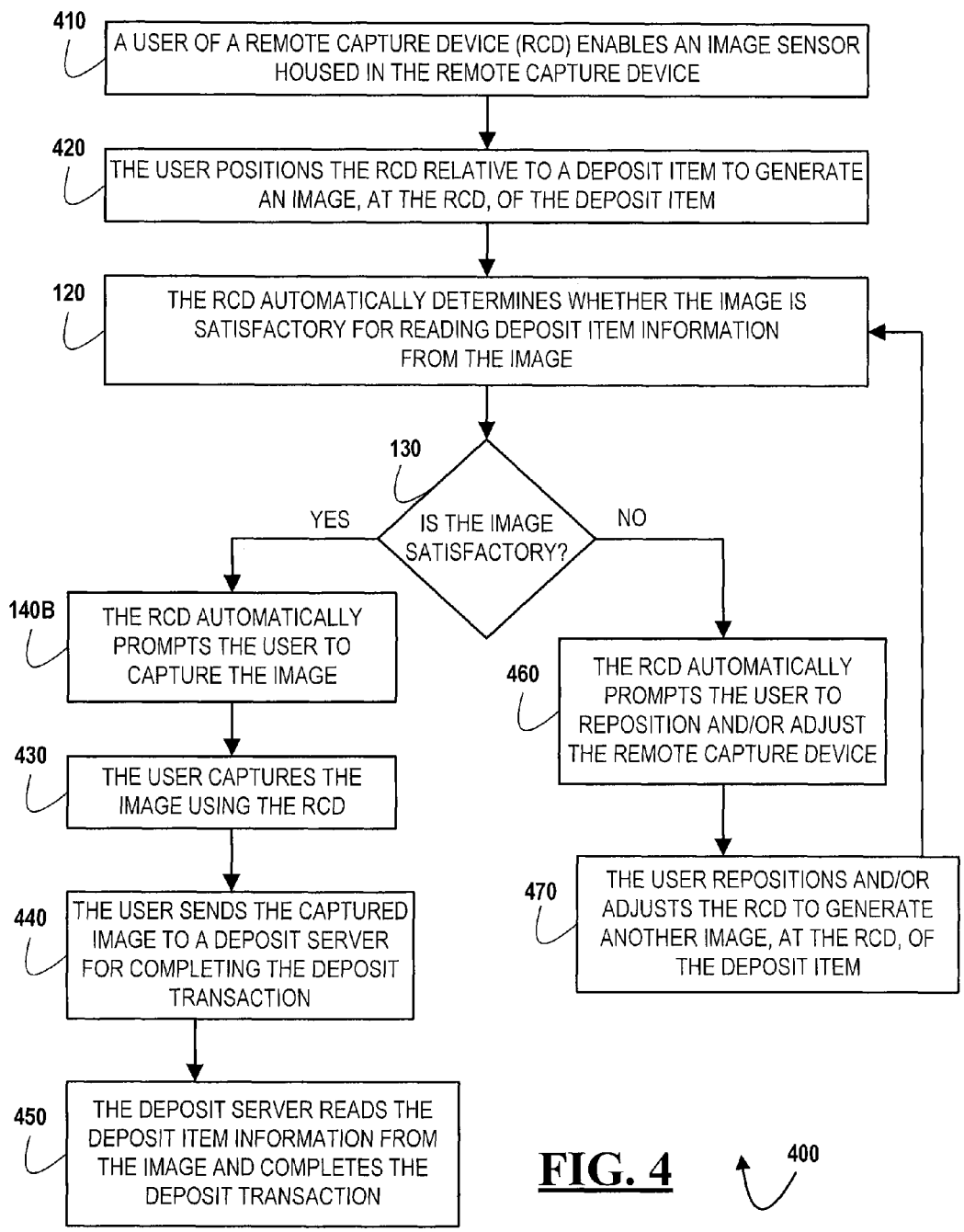
Figure 5:
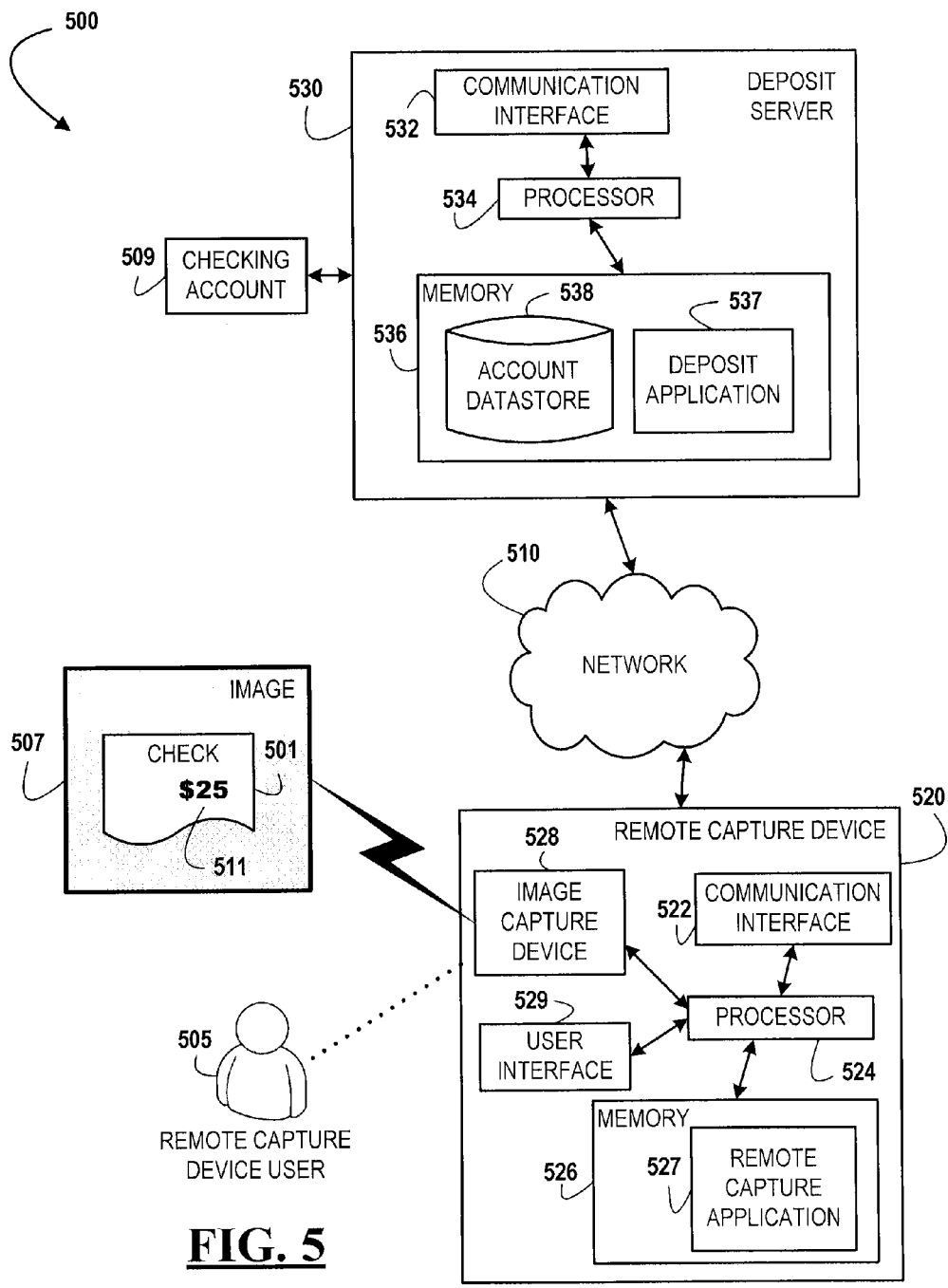
Figure 6:
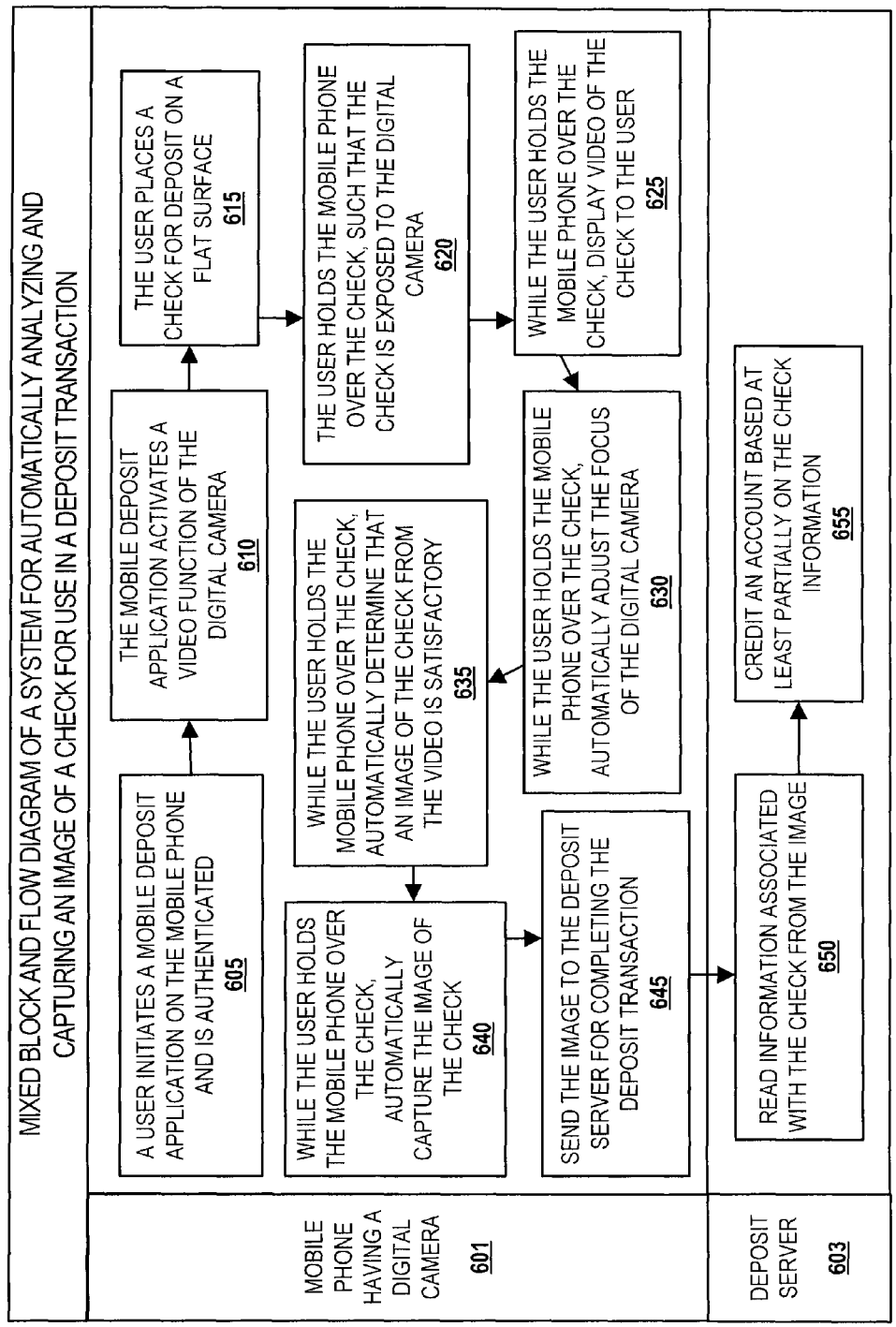

Having thus described some embodiments of the present invention in general terms, reference will now be made to the accompanying drawings, wherein:

FIGS. 1-3 is a flow diagram illustrating a general process flow for automatically analyzing and/or capturing an image of a deposit item, in accordance with an embodiment of the present invention;

FIG. 4 is a flow diagram illustrating a general process flow for automatically analyzing and/or capturing an image of a deposit item for use in a deposit transaction, in accordance with an embodiment of the present invention;

FIG. 5 is a block diagram illustrating technical components of a system for automatically analyzing and/or capturing an image of a deposit item, in accordance with an embodiment of the present invention; and FIG. 6 is a mixed block and flow diagram illustrating a system for automatically analyzing and capturing an image of a check for use in a deposit transaction, in accordance with an embodiment of the present invention.

DETAILED DESCRIPTION OF EMBODIMENTS OF THE PRESENT INVENTION

In general terms, various embodiments of the present invention are directed to using a remote capture device (e.g., mobile phone having a digital camera, flatbed scanner, etc.) to engage in a deposit transaction without having to travel to a traditional deposit location (e.g., banking center, ATM, etc.). More specifically, some embodiments provide a remote capture device that is configured to: (a) generate an image of a deposit item based at least partially on the remote capture device being exposed to the deposit item; (b) automatically determine whether the image is satisfactory for reading deposit item information (e.g., deposit amount, payee name, etc.) from the image; (c) automatically prompt the user of the remote capture device to reposition and/or adjust the remote capture device if the image is not satisfactory; (d) automatically capture the image if the image is satisfactory; and/or (e) send the captured image of the deposit item to a deposit server so that an account can be credited based at least partially on the deposit item information read from the image. In some embodiments, the remote capture device is configured to perform these actions in substantially real-time and/or while the deposit item is being exposed to the remote capture device.

Referring now to FIGS. 1-3, a general process flow 100 is provided for automatically analyzing and/or capturing an image of a deposit item, in accordance with an embodiment of the present invention. In some embodiments, the process flow 100 is performed by a remote capture device (e.g., a mobile phone having a digital camera housed therein, etc.) having hardware and/or software configured to perform one or more portions of the process flow 100. In such embodiments, as represented by block 110, the remote capture device is configured to generate an image of a deposit item, where the generating the image is based at least partially on the deposit item being exposed to the remote capture device. Then, as represented by blocks 120-130, the remote capture device is configured to automatically determine whether the image is satisfactory for reading deposit item information from the image.

If the remote capture device having the process flow 100 determines that the image is satisfactory, then the remote capture device automatically performs a predetermined action, as represented by block 140 shown in FIG. 2. More specifically, the remote capture device may: (a) automatically capture the image of the deposit item, as represented by block 140A; (b) automatically prompt a user of the remote capture device to capture the image by using the remote capture device (e.g., one or more user inputs of the remote capture device, etc.), as represented by block 140B; (c) automatically indicate to the user that the image is satisfactory, as represented by block 140C; and/or (d) automatically perform one or more other predetermined actions, as represented by block 140D.

On the other hand, if the remote capture device having the process flow 100 determines that the image is not satisfactory for reading deposit item information from the image, then the remote capture device automatically performs one or more predetermined actions, as represented by block 150 shown in FIG. 3. More specifically, the remote capture device may: (a) automatically adjust the remote capture device (e.g., adjust the focus and/or zoom of the remote capture device, activate a light and/or flash of the remote capture device, etc.), as represented by block 150A; (b) automatically prompt the user of the remote capture device to adjust the remote capture device, as represented by block 150B; (c) automatically prompt the user to reposition the remote capture device relative to the deposit item and/or vice versa, as represented by block 150C; (d) automatically enhance (e.g., crop, orient, size, focus, scale, shape, color, etc.) the image of the deposit item, as represented by block 150D; (e) automatically prompt the user to enhance the image, as represented by block 150E; (f) automatically indicate to the user that the image is not satisfactory for reading deposit item information from the image, as represented by block 150F; and/or (g) automatically perform one or more other predetermined actions, as represented by block 150G. It will be understood that the predetermined action(s) performed by the remote capture device when the image is not satisfactory may be different than predetermined actions performed when the image is satisfactory.

For simplicity, the portions of the process flow 100 represented by blocks 120-130 are sometimes collectively referred to herein as the "image quality determination." Also, it will be understood that, in some embodiments, the term "determine" is meant to have its one or more ordinary meanings (i.e., its ordinary dictionary definition(s)), but in other embodiments, that term is additionally or alternatively meant to include the one or more ordinary meanings of one or more of the following terms: conclude, decide, identify, ascertain, find, discover, learn, verify, calculate, observe, read, and/or the like. Further, it will be understood that, in some embodiments, the phrase "based at least partially on" is meant to have its one or more ordinary meanings, but in other embodiments, that phrase is additionally or alternatively meant to include the one or more ordinary meanings of one or more of the following phrases: "in response to," "upon or after," "because of," "as a result of," "if," "when," and/or the like.

It will also be understood that the remote capture device having the process flow 100 (and/or any of the other apparatuses described and/or contemplated herein) can include one or more separate and/or different apparatuses. In some embodiments, a first portion of the remote capture device is configured to perform one or more portions of the process flow 100, and one or more other portions of the same remote capture device are configured to perform the one or more other portions of the process flow 100. For example, in some embodiments, one portion (e.g., the image capture device 528 of the remote capture device 520 shown in FIG. 5, etc.) is configured to perform the portion of the process flow 100 represented by block 110, and a second portion (e.g., the processor 524 of the remote capture device 520, etc.) is configured to perform the portions represented by blocks 120-150. Of course, in other embodiments, a single apparatus (e.g., the image capture device 528, the processor 524, etc.) is configured to perform each and every portion of the process flow 100. Also, it will be understood that, in some embodiments, the remote capture device 100 is embodied as two or more remote capture devices that are, for example, operatively connected to each other.

Regarding block 110, the phrase "remote capture device," as used herein, refers to an apparatus that is configured to generate, create, acquire, receive, view, and/or capture one or more still images and/or videos (collectively referred to herein as "images" for simplicity). In some embodiments, the remote capture device refers to an apparatus that houses one or more digital cameras, image sensors, lens, and/or other image capture devices. For example, in some embodiments, the remote capture device refers to a mobile phone having a digital camera housed therein. However, in other embodiments, the remote capture device refers to the image capture device itself. Referring to the example above, in accordance with some embodiments, the remote capture device refers to the digital camera that is housed in the mobile phone. As a variation of this example, in still other embodiments, the remote capture device refers to a digital camera that is not housed in the mobile phone, but is instead located adjacent, near, and/or otherwise proximate to the mobile phone (e.g., located within arm's reach of the mobile phone, etc.) and is operatively connected to (e.g., via wireline and/or wireless connection) the mobile phone. Thus, it will be understood that the remote capture device can be embodied as an apparatus (e.g., a mobile phone that houses a digital camera, etc.), as a component of the apparatus (e.g., a digital camera housed in a mobile phone, etc.), or as a peripheral device associated with the apparatus (e.g., a digital camera operatively connected to and located proximately to a mobile phone, etc.). Additionally, in some embodiments, the phrase "remote capture device" refers to a system having a remote capture device and a peripheral image capture device operatively connected to the remote capture device.

In addition, it will also be understood that the remote capture device is so named because it is typically located remotely from a traditional deposit location, such as, for example, a financial institution, a banking center, teller terminal, an ATM, and/or the like. Instead, the remote capture device is typically located in a home, an office, on a person, and/or remotely from a traditional deposit location. In addition, because a remote capture device is configured to perform the process flow 100, the remote capture device enables its user(s) to transform any location where the remote capture device is located into a deposit location. It will also be understood that the remote capture device is typically owned, operated, serviced, held, carried, possessed, controlled, and/or maintained (collectively referred to herein as "maintained" for simplicity) by a customer of a financial institution.

Examples of remote capture devices include, but are not limited to, mobile phones (e.g., feature phones, smart phones, camera phones, etc.), cameras (e.g., digital cameras, video cameras, webcams, etc.), scanners (e.g., flatbed scanners, handheld scanners, etc.), personal digital assistants (PDAs), tablet computers, gaming devices, portable media players, image capture devices (e.g., cameras, charge coupled devices (CCD), complementary metal-oxide-semiconductor (CMOS) sensors, other image sensors, etc.), as well as, in some embodiments, one or more components thereof and/or one or more peripheral devices associated therewith. Of course, it will be understood that, in some embodiments, the remote capture device is configured to perform one or more other functions (e.g., sending and/or receiving one or more phone calls, text messages, and/or other communications, etc.) in addition to generating and/or capturing one or more images. It will be further understood that, in some embodiments, the remote capture device refers to a wireline, non-portable, non-mobile, and/or non-handheld device, such as, for example, a flatbed scanner and/or a webcam. However, in other embodiments, the remote capture device refers to a wireless, portable, mobile, and/or handheld device, such as, for example, a handheld scanner and/or mobile phone.

Further regarding block 110, the phrase "deposit item," as used herein, generally refers to one or more checks (e.g., personal checks, business checks, cashier's checks, credit card convenience checks, etc.), money orders, deposit slips, and/or the like. In some embodiments, the "deposit item" refers to two or more deposit items and/or to two or more different types of deposit items. Although many of the embodiments described herein are directed to automatically analyzing and/or capturing images of deposit items for use in deposit transactions, it will be understood that some embodiments of the present invention can be implemented to automatically analyze and/or capture images of other items (e.g., barcodes, receipts, official records, etc.) for other purposes (e.g., price checks, online banking, opening accounts, user authentication and/or identification, etc.).

Also regarding block 110, the remote capture device generates the image of the deposit item based at least partially on the remote capture device being exposed to the deposit item. In some embodiments, this means that the remote capture device is positioned proximate and/or relative to the deposit item, such that light from the deposit item is physically received by the remote capture device. For example, in some embodiments, the remote capture device includes a photographic lens and an image sensor, and the image sensor is configured to generate an image of the deposit item based at least partially on light from the deposit item passing through the lens, reaching the image sensor, and being converted into electrical signals by the image sensor. It will be understood that the remote capture device can be configured to generate one or more still images of the deposit item and/or a series of video images of the deposit item. For example, in some embodiments, the remote capture device is configured to generate a video of the deposit item, where the image referred to in block 110 represents one of the images from the video. Additionally or alternatively, in some embodiments, the remote capture device has a video feedback function, such that a user of the remote capture device can view (e.g., via a display of the remote capture device) the video images of the deposit item as the user positions the remote capture device (and/or an image capture device thereof) relative to the deposit item.

Further regarding block 110, the image of the deposit item may show the front and/or back of one or more deposit items. In some embodiments, the image may not show the deposit item in its entirety. For example, in some embodiments, the image may show only 75% of the front of the deposit item, whereas, in other embodiments, the image shows 100% of the back of the deposit item. In some embodiments, the image only shows the information needed to make the image quality determination.

Regarding blocks 120-130, the remote capture device can be configured to make the image quality determination in any way. In some embodiments, the remote capture device is configured to make the image quality determination based at least partially on whether the remote capture device itself can read the deposit item information from the image. However, in other embodiments, the remote capture device is configured to determine whether another apparatus (e.g., a deposit server, etc.) and/or a human can read deposit item information from the image. As used herein, the term "read" is meant to have its ordinary meaning (i.e., its ordinary dictionary definition) in addition to the one or more ordinary meanings of the following terms: discover, learn, calculate, identify, observe, decide, determine, collect, conclude, verify, ascertain, and/or the like.

In addition, the terms "satisfactory" and "unsatisfactory," as used herein, typically refer to the quality of the image (and/or to one or more portions of the image), as determined by the remote capture device. For example, the remote capture device can be configured to determine that the image is unsatisfactory based at least partially on the remote capture device determining that the image (and/or one or more portions of the image) is upside down, unfocused, blurry, distorted, discolored, darkened, too small, and/or otherwise unreadable, either to the remote capture device and/or to another apparatus and/or human. In some embodiments, the remote capture device is configured to determine that the image is satisfactory if the image does not show the deposit item in its entirety (i.e., the deposit item is "cut off" in the image). In some embodiments, the absence of one or more of these conditions can trigger the remote capture device to determine that the image is satisfactory.

Further regarding blocks 120-130, the deposit item information can be any information that describes, identifies, defines, and/or is otherwise associated with the deposit item referred to in block 110. In some embodiments, the deposit item information includes any information shown on the deposit item itself, such as, for example, information associated with a magnetic ink character recognition (MICR) line, endorsement, signature, watermark, account number, payee identity, payor identity, financial institution identity, deposit amount, and/or the like. However, in other embodiments, the deposit item information additionally or alternatively includes information associated with the appearance (e.g., size, shape, color, texture, etc.) of the deposit item, the type of the deposit item (e.g., business check, money order, etc.), the number of deposit items (i.e., the number of the deposit items shown in the image), and/or the like.

As referred to herein, it will be understood that a MICR line is a line of characters having a standardized font (e.g., E-13B and CMC-7), location, and size that is typically printed in magnetic ink and/or toner at and/or near the bottom of a deposit item. For example, some countries, such as the United States, Canada, Japan, Australia, Columbia, Venezuela, and the United Kingdom, have adopted E-13B as the standardized font for the MICR line, while other countries, such as Brazil, France, and several other European countries, have adopted CMC-7 as the standardized font for the MICR line. In the United States, the standards for the MICR line are developed and mandated by the American National Standards Institute (ANSI). In many instances, the characters in the MICR line include a routing number and an account number that can be used to identify the payor bank and the payor's bank account at the payor bank from which the funds will be drawn.

Also regarding the blocks 120-130, in some embodiments, the remote capture device is configured to make the image quality determination in substantially real time. For example, in some embodiments, the remote capture device is configured to make the image quality determination within moments and/or seconds (e.g., within approximately 5 seconds, etc.) of the remote capture device generating the image and/or being exposed to the deposit item. Additionally or alternatively, in some embodiments, the remote capture device having the process flow 100 is configured to make the image quality determination automatically (i.e., without human intervention). Of course, the remote capture device can be configured to receive (and/or prompt for) at least some deposit item information from the user of the remote capture device. For example, in some embodiments, the remote capture device prompts the user for the deposit amount shown on the deposit item and/or for the account number of the account involved in the deposit transaction.

Regarding block 140, as shown in FIG. 2, the remote capture device having the process flow 100 is configured to perform one or more of the predetermined actions represented by blocks 140A-140D based at least partially on the remote capture device determining that the image is satisfactory. It will be understood that the remote capture device can be configured to perform any one or more of the predetermined actions represented by blocks 140A-140D. In some embodiments, the remote capture device is configured to perform the predetermined action(s) within moments and/or seconds (e.g., within approximately 5 seconds, etc.) of making the image quality determination and/or generating the image. Additionally or alternatively, in some embodiments, the remote capture device is configured to perform the predetermined action(s) automatically (i.e., without human intervention). Thus, it will be understood that the remote capture device can be configured to perform the one or more predetermined actions automatically, dynamically, and/or in substantially real-time.

As represented by block 140A, in some embodiments, the remote capture device is configured to automatically capture the image of the deposit item based at least partially on the remote capture device determining that the image is satisfactory. In some embodiments where the remote capture device includes a shutter, the remote capture device is configured to automatically actuate the shutter to capture the image. In other embodiments, the remote capture device is configured to automatically activate an image capture function of the remote capture device (e.g., "click" an image capture button located on the remote capture device, etc.). In some embodiments, this predetermined action is accompanied by an output to the user that indicates that the image of the deposit item has been captured. For example, in some embodiments, where the remote capture device has a display that shows video of the deposit item, the display shows a still image of the deposit item upon or after the image being automatically captured by the remote capture device. As another example, in some embodiments, the display shows the phrases "IMAGE CAPTURED," "OK," and/or the like to indicate to the user that the image has been captured.

Further regarding block 140A, the remote capture device capturing the image generally means that the remote capture device stores the image of the deposit item in the memory of the remote capture device. In some embodiments, this memory is non-temporary, non-volatile, and/or long-term persistent memory. Additionally or alternatively, in some embodiments, the image is captured if a user of the remote capture device can retrieve the image from the memory of the remote capture device sometime after the deposit item is exposed to the remote capture device. Of course, it will be understood that the remote capture device may not capture every image that it generates. For example, in some embodiments, the remote capture device discards and/or erases generated images that are not captured. However, in other embodiments, the remote capture device does not discard or erase generated images that are not captured, but instead identifies and/or stores them differently. For example, in some embodiments, the remote capture device stores generated by not captured images in temporary and/or volatile memory, whereas the remote capture device stores captured images in non-temporary, non-volatile, and/or long-term persistent memory.

Referring to block 140B, in some embodiments, the remote capture device is additionally or alternatively configured to automatically prompt the user of the remote capture device to capture the image of the deposit item based at least partially on the remote capture device determining that the image is satisfactory. For example, in some embodiments, the remote capture device outputs one or more audible and/or visual messages (e.g., instructions, recommendations, commands, feedback, communications, etc.) that prompt the user to capture the image. Specifically, in some embodiments, the remote capture device is configured to display a specific capture instruction (e.g., "CAPTURE," "IMAGE OK," etc.) on the display of the remote capture device as a result of the remote capture device determining that the image is satisfactory for reading deposit item information from the image. As another example, in some embodiments, the remote capture device is configured to audibly output a series of beeps and/or other sounds when the remote capture device determines that the image is satisfactory. As still another example, in some embodiments, the remote capture device is configured to show, on the display of the remote capture device, a green box around the deposit item when the remote capture device determines that the image is satisfactory.

Additionally or alternatively, in some embodiments, as represented by block 140C, the remote capture device is configured to automatically indicate to the user of the remote capture device that the image is satisfactory based at least partially on the remote capture device determining that the image is satisfactory. It will be understood that the remote capture device indicating to the user that image is satisfactory may also serve to prompt the user to capture the image, and/or vice versa. For example, in some embodiments, the remote capture device is configured to display the word "CAPTURE" on the display of the remote capture device upon determining that the image is satisfactory, which serves to both indicate to the user that the image is satisfactory and prompt the user to capture the image. However, in some embodiments, the remote capture device is configured to indicate to the user that the image is satisfactory, even though the remote capture device is also configured to automatically capture the image.

In addition to the predetermined actions represented by block 140A-C, the remote capture device can be configured to automatically perform one or more other predetermined actions based at least partially on the remote capture device determining that the image is satisfactory, as represented by block 140D. For example, in some embodiments, in addition to automatically capturing the image, the remote capture device is configured to automatically send (and/or prompt the user to send) the captured image to a deposit server for completing a deposit transaction. As another example, in some embodiments, after the image is captured by the remote capture device, the remote capture device automatically sends and/or posts the captured image to an electronic banking service (e.g., online banking, mobile banking, SMS banking, etc.), where the electronic banking service is associated with an account held by the remote capture device user. As still another example, in some embodiments, after the image is captured by the remote capture device, the remote capture device is configured to automatically store the image in a predetermined folder of images (e.g., a folder entitled "Captured Images") on the remote capture device.

Regarding block 150, as shown in FIG. 3, the remote capture device having the process flow 100 is configured to perform one or more of the predetermined actions represented by blocks 150A-150G based at least partially on the remote capture device determining that the image is not satisfactory for reading deposit item information from the image. It will be understood that the remote capture device can be configured to perform any one or more of the predetermined actions represented by blocks 150A-150G. In some embodiments, the remote capture device is configured to perform the predetermined action(s) within moments, seconds, and/or minutes (e.g., within approximately 1 minute, etc.) of making the image quality determination and/or generating the image. Additionally or alternatively, in some embodiments, the remote capture device is configured to perform the predetermined action(s) automatically (i.e., without human intervention). Thus, it will be understood that the remote capture device can be configured to perform the one or more predetermined actions automatically, dynamically, and/or in substantially real-time.

As represented by block 150A, in some embodiments, the remote capture device is configured to automatically adjust the remote capture device based at least partially on the remote capture device determining that the image is not satisfactory. For example, in some embodiments, the remote capture device is configured to automatically adjust the focus of the remote capture device. As another example, in some embodiments, the remote capture device is configured to automatically adjust the zoom of the remote capture device. As still another example, in some embodiments, the remote capture device is configured to activate a light and/or flash of the remote capture device. In some embodiments, the remote capture device automatically performs these adjustments in order to generate a second image of the deposit item, where the second image represents an improvement over the original image and/or where the second image is satisfactory for reading deposit item information from the second image. In some embodiments, the remote capture device is configured to automatically adjust the remote capture device when the remote capture device (a) recognizes and/or detects a deposit item from the image, but (b) determines that the image is not satisfactory for reading deposit item information from the image.

Regarding block 150B, in some embodiments, the remote capture device is configured to automatically prompt the user of the remote capture device to adjust the remote capture device based at least partially on the remote capture device determining that the image is not satisfactory. For example, in some embodiments, the remote capture device outputs one or more audible and/or visual messages (e.g., instructions, recommendations, commands, feedback, communications, etc.) that prompt the user to adjust the focus of the remote capture device, adjust the zoom of the remote capture device, activate a light and/or flash of the remote capture device, and/or operate the remote capture device in a different way. Specifically, in some embodiments, the remote capture device is configured to display a specific adjusting instruction (e.g., "ZOOM IN," "ACTIVATE LIGHT," etc.) on the display of the remote capture device as a result of the remote capture device determining why the image is not satisfactory and/or how to generate a better image. In some embodiments, the remote capture device prompts the user to adjust the remote capture device so that a second image of the deposit item can be generated by the remote capture device, where the second image represents an improvement over the original image and/or where the second image is satisfactory for reading deposit item information from the second image.

Regarding block 150C, in some embodiments, the remote capture device is configured to automatically prompt the user to reposition the remote capture device relative to the deposit item, and/or vice versa, based at least partially on the remote capture device determining that the image is not satisfactory. For example, in some embodiments, the remote capture device outputs one or more audible and/or visual messages that prompt the user to, for example, rotate the remote capture device, reorient the remote capture device, and/or move the remote capture device up, down, to the left, to the right, towards the deposit item, away from the deposit item, and/or the like. Specifically, in some embodiments, the remote capture device is configured to display a specific repositioning instruction (e.g., "MOVE LEFT," "MOVE CLOSER," "ROTATE CLOCKWISE," etc.) on the display of the remote capture device as a result of the remote capture device determining why the image is not satisfactory and/or how to generate a better image. As another example, in some embodiments, the remote capture device is configured to prompt the user to reposition the deposit item relative to the remote capture device. For example, in some embodiments, the remote capture device outputs one or more audible and/or visual messages that prompt the user to, for example, turn the deposit item right side up, rotate it 90 degrees, move the deposit item so that it is orthogonal to the image sensor of the remote capture device, and/or the like. In some embodiments, the remote capture device prompts the user to reposition the remote capture device and/or the deposit item so that a second image of the deposit item can be generated by the remote capture device, where the second image represents an improvement over the original image and/or where the second image is satisfactory for reading deposit item information from the second image.

In some embodiments, the remote capture device having the process flow 100 is configured to determine whether the image is satisfactory and/or to prompt the user by using one or more MICR lines of the deposit item shown in the image. For example, in some embodiments, the remote capture device is configured to determine whether the remote capture device (and/or one or more other apparatuses and/or humans) can read one or more of the MICR lines shown in the image. If not (e.g., because the MICR line(s) are too small, too dark, blurry, etc.), in such embodiments, the remote capture device can be configured to prompt the user to reposition the remote capture device (and/or the deposit item) and/or to adjust the remote capture device so that the remote capture device can read those one or more MICR lines in a subsequently generated image of the deposit item.

As another example, in some embodiments, the remote capture device is configured to determine whether a MICR line shown in the image is within a predefined distance from an edge of a deposit item shown in the image. For example, the remote capture device may determine whether the MICR line is within a predefined distance from the bottom edge of the deposit item and/or whether the MICR line is contained within a predefined distance from any edge of the deposit item. In one exemplary embodiment, the predefined distance is a distance within the range of a half inch and two and a half inches, inclusive, such as, for example, one and a half inches. In another embodiment, the predefined distance is approximately one and a half inches.

Based on determining whether the MICR line is within a predetermined distance from an edge of the deposit item shown in the image, the remote capture device having the process flow 100 can be configured to determine, for example, the orientation of the deposit item shown in the image. As an example, in some embodiments, the remote capture device is configured to determine that a deposit item is "upside down" in the image (and/or that the image is upside down) based at least partially on determining that a MICR line is located near the top of a deposit item shown in the image. Accordingly, the remote capture device can be configured to adjust the remote capture device and/or prompt the user to reposition the remote capture device (and/or the deposit item), such that the deposit item is shown "right side up" in a subsequently generated image of the deposit item. In this way, the remote capture device can be configured to determine the "top" and "bottom" of a deposit item shown in the image and correct (and/or prompt the user to correct) one or more portions of the image (if needed) based at least partially on these determination(s). It will also be understood that the remote capture device having the process flow 100 can be configured to determine what deposit item information is located "above" and "below" the MICR line by determining where the MICR line is relative to an edge of a deposit item shown in the image.

Regarding block 150D, in some embodiments, the remote capture device is configured to automatically enhance the image of the deposit item based at least partially on the remote capture device determining that the image is not satisfactory. As used herein, the term "enhance" generally refers to the process of "cleaning up" an image by at least partially changing one or more portions of the image. For example, in some embodiments, the remote capture device is configured to enhance an image by focusing, cropping, orienting, sizing, scaling, shaping, and/or coloring one or more portions of the image. As other example, in some embodiments, the remote capture device is configured to enhance one or more portions of the image by creating a bi-tonal image of the one or more image portions, by correcting the geometry of those portion (s), by converting those portion(s) to gray-scale, by creating a binarized image of those portion(s), and/or the like.

It will be understood that the remote capture device can be configured to enhance the image originally generated by the remote capture device (e.g., the image referred to in block 110) instead of, or in addition to, generating a second image of the deposit item as a result of the user repositioning and/or adjusting the remote capture device (and/or the deposit item). Also, the remote capture device can be configured to enhance one or more portions of the image that are unsatisfactory while leaving alone the one or more other portions of the image that are satisfactory. Of course, in other embodiments, the remote capture device can also be configured to enhance the one or more satisfactory portions of the image (in the same way or in a different way) before, after, or substantially simultaneous with the remote capture device enhancing the one or more unsatisfactory portions of the image.

Also, in some embodiments, the remote capture device can be configured to enhance the one or more unsatisfactory portions of the image by using one or more MICR lines shown in the image. For example, in some embodiments, the remote capture device is configured to determine whether the remote capture device (and/or one or more other apparatuses and/or humans) can read one or more of the MICR lines shown in the image. If not (e.g., because the MICR line(s) are too small, too dark, blurry, etc.), in such embodiments, the remote capture device is configured to enhance one or more portions of the image (e.g., by enlarging, lightening, focusing those image portions, etc.) until the remote capture device can read those one or more MICR lines from the enhanced image.

As another example, in some embodiments, the remote capture device is configured to determine that a deposit item is "upside down" in the image (and/or that the image is upside down) based at least partially on determining that a MICR line is located near the top of a deposit item shown in the image. In such embodiments, the remote capture device is configured to enhance the portion of the image that shows the upside down deposit item (and/or enhance the entire upside down image) by correcting the orientation (e.g., by reorienting and/or rotating, etc.) of the unsatisfactory image portion (and/or the entire image). In this way, the remote capture device can be configured to determine the "top" and "bottom" of a deposit item shown in the image and correct one or more portions of the image (if needed) based at least partially on these determination(s).

Regarding block 150E, in some embodiments, the remote capture device is configured to automatically prompt the user to enhance the image of the deposit item based at least partially on the remote capture device determining that the image is not satisfactory. For example, in some embodiments, the remote capture device outputs one or more audible and/or visual messages that prompt the user to, for example, rotate the image, lighten the image, focus the image, enlarge the image, color the image, etc. Specifically, in some embodiments, the remote capture device is configured to display a specific enhancing instruction (e.g., "ENLARGE IMAGE," "LIGHTEN IMAGE," etc.) on the display of the remote capture device as a result of the remote capture device determining why the image is not satisfactory and/or how to enhance the image. As other example, in some embodiments, the user is prompted to enhance one or more portions of the image by creating a bi-tonal image of the one or more image portions, by correcting the geometry of those portion(s), by converting those portion(s) to gray-scale, by creating a binarized image of those portion(s), and/or the like. In some embodiments, the user of the remote capture device can enhance one or more portions of the image by using one or more user input devices (e.g., buttons, touchscreen displays, microphones, etc.) of the remote capture device. In some embodiments, the remote capture device prompts the user to enhance the image until the remote capture device (and/or another apparatus and/or human) can read information associated with the deposit item (e.g., MICR line, deposit amount, payee name, etc.) from the image. Also, it will be understood that the remote capture device can be configured to prompt the user to enhance the image originally generated by the remote capture device (e.g., the image referred to in block 110) instead of, or in addition to, prompting the user to generate a second image of the deposit item by repositioning and/or adjusting the remote capture device (and/or the deposit item).

Regarding block 150F, in some embodiments, the remote capture device is additionally or alternatively configured to automatically indicate to the user of the remote capture device that the image is not satisfactory based at least partially on the remote capture device determining that the image is not satisfactory. It will be understood that the remote capture device indicating to the user that image is not satisfactory may also serve to prompt the user to adjust and/or reposition the remote capture device (and/or the deposit item), and/or vice versa. For example, in some embodiments, the remote capture device is configured to display "DO NOT CAPTURE" on the display of the remote capture device upon determining that the deposit item information in the image is not satisfactory, which serves to both indicate to the user that the image is not satisfactory and to prompt the user to reposition and/or adjust the remote capture device (and/or the deposit item). As another example, in some embodiments, the remote capture device is configured to audibly output a series of beeps and/or other sounds when the remote capture device determines that the image is not satisfactory. As still another example, in some embodiments, the remote capture device is configured to show, on the display of the remote capture device, a red box around the deposit item when the remote capture device determines that the image is not satisfactory.

In addition to the predetermined actions represented by block 150A-F, the remote capture device can be configured to automatically perform one or more other predetermined actions based at least partially on the remote capture device determining that the image is not satisfactory. For example, in some embodiments, the remote capture device is configured to discard the generated image and/or erase the image from memory based at least partially on determining that the image is not satisfactory.

In some embodiments, the remote capture device having the process flow 100 can be configured to perform any one or more portions of the process flow 100 represented by blocks 110-150 upon or after one or more triggering events, which, in some embodiments, is one or more of the other portions of the process flow 100. As used herein, it will be understood that a "triggering event" refers to an event that automatically triggers the execution, performance, and/or implementation of a triggered action, either immediately, nearly immediately (e.g., within seconds, within minutes), or sometime after the occurrence of the triggering event. For example, in some embodiments, the remote capture device is configured such that the remote capture device receiving the image (the triggering event) automatically and immediately triggers the remote capture device to determine whether the image is satisfactory for reading deposit item information from the image (the triggered action). In some embodiments, the remote capture device is additionally or alternatively configured to automatically perform the predetermined action (triggered action) nearly immediately after automatically determining that the image is satisfactory (triggering event).

In some embodiments, the apparatus is configured to automatically perform one or more of the portions of the process flow 100 represented by blocks 110-150. In other embodiments, one or more of the portions of the process flow 100 represented by blocks 110-150 require and/or involve at least some human intervention. In addition to the process flow 100, any of the embodiments described and/or contemplated herein can involve one or more triggering events, triggered actions, automatic actions, apparatus actions, and/or human actions. It will also be understood that the apparatus having the process flow 100 can be configured to perform any one or more portions of any embodiment described and/or contemplated herein, including, for example, any one or more portions of the process flows 400 and/or 600 described later herein. In addition, the number, order, and/or content of the portions of the process flow 100 are exemplary and may vary. Indeed, the process flow 100, like all of the other process flows described herein, can include one or more additional and/or alternative process flow portions. In addition, it will be understood that the remote capture device configured to perform the process flow 100 can be configured to perform one or more additional and/or alternative functions. For example, in some embodiments, before the remote capture device generates the image represented by block 110, the remote capture device outputs one or more audible and/or visual messages to the user of the remote capture device that instruct the user on how to adjust the remote capture device and/or position the remote capture device relative to the deposit item (and/or vice versa) in order to generate an image that is likely to be satisfactory. As another example, in some embodiments, the remote capture device having the process flow 100 is configured to send and/or receive telephone calls, play video games, organize a calendar, and/or the like.

Also, it will be understood that the remote capture device having the process flow 100 (and/or the process flows 400 and/or 600) can be configured to automatically analyze and/or capture the front of a deposit item and/or the back of a deposit item. Specifically, in some embodiments, the remote capture device having the process flow 100 is configured to perform the process flow 100 once for the front of a deposit item and then a second time for the back of the deposit item. For example, in some embodiments, the remote capture device is configured to generate an image of the front of a check, determine that the image is satisfactory for reading check information therefrom, automatically capture the image of the front of the check, prompt the user of the remote capture device to flip the check over, generate an image of the back of the check, determine that the image is satisfactory for reading check information therefrom, automatically capture the image of the back of the check, and then send both the image of the front of the check and the image of the back of the check to a deposit server for completing a deposit transaction.

Referring now to FIG. 4, a general process flow 400 is illustrated for automatically analyzing and capturing an image of a deposit item, in accordance with an embodiment of the present invention. In some embodiments, the process flow 400 represents an example of the process flow 100 described in connection with FIGS. 1-3. Additionally, in some embodiments, the process flow 400 is performed, collectively, by a remote capture device and a deposit server, where each apparatus has the hardware and/or software needed to perform its respective function(s) and/or portion(s) of the process flow 400. In accordance with some embodiments, the remote capture device is operatively connected to, but remotely located from, the deposit server. In addition, in some embodiments, the remote capture device and deposit server referred to in the process flow 400 are the remote capture device 520 and the deposit server 530, respectively, shown in FIG. 5.

As represented by block 410, a user of the remote capture device enables an image sensor housed the remote capture device. For example, in some embodiments where the remote capture device is a mobile phone having a digital camera housed therein, the user activates the digital camera of the mobile phone (e.g., by initializing the digital camera function, opening a remote capture application, turning on the digital camera, etc.). After the user enables the image sensor, the user positions the remote capture device relative to a deposit item to generate an image, at the remote capture device, of the deposit item, as represented by block 420. For example, in some embodiments, the user places the deposit item on a flat surface and then holds the remote capture device over the deposit item, such that the deposit item is exposed to the remote capture device and/or the image capture device housed therein.

As represented by blocks 120-130 of the process flow 400, the remote capture device is configured to automatically determine whether the image of the deposit item is satisfactory for reading deposit item information from the image. If the remote capture device determines that the image is satisfactory, then the remote capture device is configured to automatically prompt the user to capture the image, as represented by block 140B of the process flow 400. Thereafter, as represented by block 430, the user captures the image using the remote capture device, and as represented by block 440, the user sends the captured image to a deposit server for completing the deposit transaction. After receiving the captured image from the remote capture device, the deposit server reads the deposit item information from the image and then completes the deposit transaction, as represented by block 450.

However, if the remote capture device determines that the image is not satisfactory, then the remote capture device is configured to automatically prompt the user to reposition and/or adjust the remote capture device, as represented by block 460. In response to this prompting, the user repositions and/or adjusts the remote capture device to generate another image of the deposit item at the remote capture device, as represented by block 470. Thereafter, the process flow 400 loops back to block 120, such that the remote capture device is configured to automatically determine whether the newly-generated image is satisfactory for reading deposit item information therefrom. If the remote capture device determines that this newly-generated image is satisfactory, then the process flow 400 branches to block 140B of the process flow 400, as described above. However, if the remote capture device determines that the newly-generated image is not satisfactory, then the process flow 400 branches again to blocks 460 and 470 for generating still another image. Thus, it will be understood that the remote capture device may determine that several images are unsatisfactory before determining that a subsequently-generated image is satisfactory. In other words, in some embodiments, the process flow 400 may loop several times from block 120 through block 470 and back to block 120 until the process flow branches to blocks 140B-450.

Of course, the embodiment illustrated in FIG. 4 is merely exemplary and other embodiments may vary without departing from the scope and spirit of the present invention. For example, in some alternative embodiments, if the remote capture device determines that the image is satisfactory, then the remote capture device is configured to automatically capture the image instead of being configured to prompt the user to capture the image. Also, the remote capture device may be configured to perform any of the portions of the process flow 400 represented by blocks 410-440 and 460-470 upon or after one or more triggering events, which, in some embodiments, is the performance of one or more of the other portions of the process flow 400.

Referring now to FIG. 5, a system 500 is provided for automatically analyzing and/or capturing an image of a deposit item, in accordance with an embodiment of the present invention. As illustrated, the exemplary system 500 includes a network 510, a remote capture device 520, and a deposit server 530. Also shown are a remote capture device user 505 and an image 507 that shows the check 501. It will be understood that the check 501 includes the deposit amount 511 of $25, and that the check 501 also includes deposit item information that is not shown (e.g., information associated with a payee identity, an account number, a MICR line, etc.).

Also, it will be understood that the remote capture device user 505 has access to the remote capture device 520 and to the check 501.

In some embodiments, the user 505 can view, receive, generate, create, acquire, and/or capture the image 507 by using the remote capture device 520. In other embodiments, the remote capture device 520 views, receives, generates, and/or captures the image 507 automatically (i.e., without the user's 505 intervention). In addition, in some embodiments, the remote capture device 520 is exposed to and/or located proximately to the check 501 when the image 507 is viewed, received, generated, and/or captured by the remote capture device 520. Also, in accordance with some embodiments, the remote capture device 520 is located remotely from the deposit server 530.

In addition, it will be understood that, in this example embodiment, the user 505 intends to deposit the sum of the deposit amount 511 (i.e., $25) into the checking account 509. Also, the checking account 509 is held by the user 505 and is maintained by a bank (not shown) for the benefit of that user 505, who is a customer of that bank. Still further, it will be understood that, in this example embodiment, the remote capture device 520 is maintained by the remote capture device user 505, and that the deposit server 530 is maintained by the same bank that maintains the checking account 509.

As shown in FIG. 5, the remote capture device 520 and the deposit server 530 are each operatively and selectively connected to the network 510, which may include one or more separate networks. In addition, the network 510 may include one or more interbank networks, telephone networks, telecommunication networks, local area networks (LANs), wide area networks (WANs), and/or global area networks (GANs) (e.g., the Internet, etc.). It will also be understood that the network 510 may be secure and/or unsecure and may also include wireless and/or wireline technology.

The remote capture device 520 can include any remote capture device described and/or contemplated herein. In addition, the remote capture device 520 can initiate, execute, complete, and/or otherwise facilitate any one or more portions of any embodiment described and/or contemplated herein. In some embodiments, the remote capture device 520 includes one or more mobile phones, gaming devices, digital cameras, flatbed scanners, and/or the like. As illustrated in FIG. 5, the remote capture device 520 includes a communication interface 522, a processor 524, a memory 526 having a remote capture application 527 stored therein, an image capture device 528, and a user interface 529. In such embodiments, the processor 524 is operatively and selectively connected to the communication interface 522, the user interface 529, the image capture device 528, and the memory 526.

Each communication interface described herein, including the communication interface 522, generally includes hardware, and, in some instances, software, that enables a portion of the system 500, such as the remote capture device 520, to send, receive, and/or otherwise communicate information to and/or from the communication interface of one or more other portions of the system 500. For example, the communication interface 522 of the remote capture device 520 may include a modem, network interface controller (NIC), network adapter, network interface card, and/or some other electronic communication device that operatively connects the remote capture device 520 to another portion of the system 500, such as, for example, the deposit server 530.

Each processor described herein, including the processor 524, generally includes circuitry for implementing the audio, visual, and/or logic functions of that portion of the system 500. For example, the processor may include a digital signal processor device, a microprocessor device, and/or various analog-to-digital converters, digital-to-analog converters, and/or other support circuits. Control and signal processing functions of the apparatus in which the processor resides may be allocated between these one or more devices according to their respective capabilities. The processor may also include functionality to operate one or more software programs based at least partially on computer-executable program code portions thereof, which may be stored, for example, in a memory device, such as in the remote capture application 527 of the memory 526 of the remote capture device 520.

Each memory device described herein, including the memory 526 for storing the remote capture application 527 and/or other information, may include any computer-readable medium. For example, the memory may include volatile memory, such as volatile random access memory (RAM) having a cache area for the temporary storage of data. Memory may also include non-volatile memory, which may be embedded and/or may be removable. The non-volatile memory may additionally or alternatively include an EEPROM, flash memory, and/or the like. The memory may store any one or more of portions of information used by the apparatus in which it resides to implement the functions of that apparatus. The memory may be non-transitory or transitory.

As shown in FIG. 5, the memory 526 includes the remote capture application 527. The remote capture application 527 may instruct and/or cause the processor 524 (and/or one or more other portions of the remote capture device 520) to perform any one or more of the functions described herein as being performed by "a remote capture device," by the remote capture device 520, and/or by the remote capture application 527. Additionally or alternatively, the remote capture application 527 can be executable to initiate, execute, complete, and/or otherwise facilitate any one or more portions of any embodiment described and/or contemplated herein, such as, for example, any one or more portions of the process flows 100, 400, and/or 600 described herein.

For example, in some embodiments, the remote capture application 527 is executable to receive and/or generate an image (e.g., the image 507, etc.) that shows a deposit item (e.g., the check 501, etc.). In some embodiments, the remote capture application 527 is executable to determine, automatically or otherwise, whether an image (e.g., the image 507, etc.) is satisfactory for reading deposit item information from the image (e.g., the deposit amount 511 of $25, etc.). In still other embodiments, the remote capture application 527 is executable to perform, automatically or otherwise, any one or more of the predetermined actions represented by blocks 140A-140D and/or the predetermined actions represented by blocks 150A-150G (and/or any other predetermined action described and/or contemplated herein). For example, in some embodiments, the remote capture application 527 is executable to automatically adjust the remote capture device 520 (e.g., adjust the zoom and/or focus of the image capture device 528, etc.). As another example, in some embodiments, the remote capture application 527 is executable to automatically capture an image of a deposit item using the image capture device 528. As still another example, in some embodiments, the remote capture application 527 is additionally or alternatively executable to credit an account (e.g., the account 509, etc.) based at least partially on the deposit item information associated with the deposit item.

In some embodiments, the remote capture application 527 is additionally or alternatively executable to perform one or more functions other than those previously described herein. For example, in some embodiments, the remote capture application 527 is executable to require the user 505 to identify and/or authenticate himself/herself to the remote capture application 527 before the remote capture application 527 will initiate, execute, complete, and/or otherwise facilitate any of the functions described and/or contemplated herein. For example, in some embodiments, the remote capture application 527 is executable to identify and/or authenticate the user 505 based at least partially on an username/password, personal identification number (PIN), smart card, token (e.g., USB token, etc.), biometric information, and/or some other information, device, and/or credential that the user 505 provides to the remote capture application 527. Additionally or alternatively, in some embodiments, the remote capture application 527 is executable to identify and/or authenticate the user 505 by using one-, two-, or multi-factor identification and/or authentication. For example, in some embodiments, the remote capture application 527 requires two-factor authentication, such that the remote capture device user 505 must provide the correct smart card and enter the correct PIN in order to authenticate the user 505 to the remote capture application 527.

It will also be understood that, in some embodiments, the remote capture application 527 is executable to enable the remote capture device user 505 and/or the remote capture device 520 to communicate with one or more other portions of the system 500, and/or vice versa. In some embodiments, the remote capture application 527 is executable to access an electronic banking service (e.g., online banking, mobile banking, SMS banking, etc.). Further it will be understood that, in some embodiments, the remote capture application 527 is created, provided, controlled, and/or maintained by the bank that maintains the deposit server 530 and/or by an individual or business (not shown). For example, in some embodiments, the remote capture device 520 is embodied as a mobile phone, and the remote capture application 527 is embodied as an "app" that was created by a bank and/or by a software maker for execution on the mobile phone. Also, it will be understood that, in some embodiments, the remote capture application 527 includes one or more computer-executable program code portions for instructing the processor 524 to perform one or more of the functions of the remote capture application 527 and/or of the remote capture device 520 described and/or contemplated herein. In some embodiments, the remote capture application 527 may include and/or use one or more network and/or system communication protocols.

Also shown in FIG. 5 is the image capture device 528, which may include one or more cameras (e.g., digital or otherwise, etc.), charge coupled devices (CCD), complementary metal-oxide-semiconductor (CMOS) sensors, image sensors, and/or the like, including any one or more of the image capture devices described and/or contemplated herein. The image capture device 528 may include one or more different types of image capture devices. In some embodiments, the image capture device 528 is configured to receive, detect, recognize, and/or capture optical light, ultraviolet light, and/or infrared light. In some embodiments, the image capture device 528 can be configured to view, receive, acquire, generate, create, and/or capture one or more still images and/or videos. In some embodiments, the image capture device 528 is configured to communicate one or more generated and/or captured images to the processor 524. Additionally or alternatively, in some embodiments, the image capture device 528 includes one or more features, including, but not limited to, a zoom, focus, flash, lens, shutter, viewfinder, and/or the like. In some embodiments, the image capture device 528 has a resolving power, which, for example, defines the detail and/or resolution with which an image can be generated and/or captured by the image capture device 528.

In some embodiments, the resolving power associated with the image capture device 528 is measured in the number of pixel sensors (sometimes referred to merely as "pixels") used by the image capture device 528 in order to capture the image. In some embodiments, the image capture device 528 is housed in the remote capture device 520. However, in other embodiments, the image capture device 528 is operatively connected to the remote capture device 520 but is not housed in the remote capture device 520; instead, in such embodiments, the image capture device 528 is located adjacent, near, within arm's reach, and/or otherwise proximate to the remote capture device 520 (e.g., a peripheral digital camera plugged into a mobile phone, etc.).

It will also be understood that the remote capture device 520 also includes the user interface 529. It will be understood that the user interface 529 (and any other user interface described and/or contemplated herein) can include and/or be embodied as one or more user interfaces. In some embodiments, the user interface 529 includes one or more user output devices for presenting (e.g., communicating, rendering, displaying, outputting, etc.) information to the user 505, such as, for example, one or more displays, speakers, and/or the like. In some embodiments, the user interface 529 additionally or alternatively includes one or more user output devices for presenting information to the remote capture device user 505. In some embodiments, the user interface 529 additionally or alternatively includes one or more user input devices, such as, for example, one or more buttons, keys, dials, levers, directional pads, joysticks, keyboards, mouses, accelerometers, controllers, microphones, touchpads, touchscreens, haptic interfaces, scanners, biometric readers, motion detectors, cameras, and/or the like for receiving information from one or more items (e.g., the check 501, etc.) and/or the remote capture device user 505. In some embodiments, the user interface 529 is housed in the remote capture device 520. However, in other embodiments, the user interface 529 is operatively connected to the remote capture device 520 but is not housed in the remote capture device 520; instead, in such embodiments, the user interface 529 is located adjacent, near, within arm's reach, and/or otherwise proximate to the remote capture device 520 (e.g., a peripheral touchscreen display plugged into a digital camera, etc.).

FIG. 5 also illustrates the deposit server 530. The deposit server 530 may include one or more servers, mainframes, engines, network devices, front end systems, back end systems, and/or the like. In some embodiments, such as the one illustrated in FIG. 5, the deposit server 530 includes a communication interface 532, a processor 534, and a memory 536, which includes a deposit application 537 and an account datastore 538 stored therein. As shown, the communication interface 532 is operatively connected to the processor 534, which is operatively connected to the memory 536.

The deposit application 537 may instruct and/or cause the processor 534 (and/or one or more other portions of the deposit server 530) to perform any one or more of the functions described herein as being performed by "a deposit server," by the deposit server 530, and/or by the deposit application 537. Additionally or alternatively, the deposit application 537 can be executable to initiate, execute, complete, and/or otherwise facilitate any one or more portions of any embodiment described and/or contemplated herein, such as, for example, any one or more portions of the process flows 100, 400, and/or 600 described herein.

For example, in some embodiments, the deposit application 537 is executable to receive an image that shows a deposit item (e.g., the image 507 that shows the check 501, etc.). As another example, in some embodiments, the deposit application 537 is executable to read deposit item information (e.g., the deposit amount 511, etc.) from a captured image. As another example, in some embodiments, the deposit application 537 is additionally or alternatively executable to credit an account (e.g., the checking account 509, etc.) based at least partially on the deposit item information associated with the deposit item. For example, in some embodiments, the deposit application 537 is executable to transfer funds from a payor account identified in the deposit item information, in an amount identified in the deposit item information, and to a payee account identified in the deposit item information. In some embodiments, the deposit application 537 can be configured to perform one or more of the same functions previously described herein as being performed by the remote capture application 527 (and/or vice versa).

It will also be understood that, in some embodiments, the deposit application 537 is configured to enable the deposit server 530 to communicate with one or more other portions of the system 500, such as, for example, the account datastore 538 and/or the remote capture device 520, and/or vice versa. It will further be understood that, in some embodiments, the deposit application 537 is configured to initiate, execute, complete, and/or otherwise facilitate one or more financial transactions and/or to maintain one or more financial accounts (e.g., the checking account 509, etc.) stored in the account datastore 538. In some embodiments, the deposit application 537 includes one or more computer-executable program code portions for instructing the processor 534 to perform one or more of the functions of the deposit application 537 and/or deposit server 530 described and/or contemplated herein. In some embodiments, the deposit application 537 may include and/or use one or more network and/or system communication protocols.

In addition to the deposit application 537, the memory 536 also includes the account datastore 538. It will be understood that the account datastore 538 can be configured to store any type and/or amount of information. For example, in some embodiments, the account datastore 538 includes information associated with one or more transactions, accounts, account holders, and/or the like. In some embodiments, the account datastore 538 may also store any information related to processing images captured by remote capture devices. In some embodiments, the account datastore 538 additionally or alternatively stores information associated with electronic banking services.

Also, the account datastore 538 may include any one or more storage devices, including, but not limited to, datastores, data repositories, databases, and/or any of the other storage devices typically associated with a computer system. It will also be understood that the account datastore 538 may store information in any known way, such as, for example, by using one or more computer codes and/or languages, alphanumeric character strings, data sets, figures, tables, charts, links, documents, and/or the like. Further, in some embodiments, the account datastore 538 may include information associated with one or more applications, such as, for example, the deposit application 537. It will also be understood that, in some embodiments, the account datastore 538 provides a real-time or substantially real-time representation of the information stored therein, so that, for example, when the processor 534 accesses the account datastore 538, the information stored therein is current or nearly current. The account datastore 538 can also dynamically store information, such that the information stored therein (e.g., account balances, transaction information, rules for depositing checks, etc.) can be quickly and/or immediately added, deleted, changed, revised, updated, and/or the like.

Of course, it will be understood that the embodiment illustrated in FIG. 5 is exemplary and that other embodiments may vary. For example, in some embodiments, some or all of the portions of the system 500 are combined into a single portion. Specifically, in some embodiments, the remote capture device 520 and the deposit server 530 are combined into a single remote capture and deposit device that is configured to perform all of the same functions of those separate portions as described and/or contemplated herein. Likewise, in some embodiments, some or all of the portions of the system 500 are separated into two or more distinct portions. In addition, the various portions of the system 500 may be maintained by the same or separate parties. For example, in some embodiments, a bank may maintain the deposit server 530, whereas the remote capture device user 505 may maintain the remote capture device 520. However, in other embodiments, a bank may maintain both the deposit server 530 and the remote capture device 520.

It will also be understood that the system 500 (and/or one or more portions of the system 500) may include and/or implement any embodiment of the present invention described and/or contemplated herein. For example, in some embodiments, the system 500 (and/or one or more portions of the system 500) is configured to implement any one or more of the embodiments of the process flow 100 described and/or contemplated herein in connection with FIGS. 1-3, any one or more of the embodiments of the process flow 400 described and/or contemplated herein in connection with FIG. 4, and/or any one or more of the embodiments of the process flow 600 described and/or contemplated herein in connection with FIG. 6.

As a specific example, in accordance with an embodiment of the present invention, the remote capture device 520 is configured to: (a) receive the image 507 that shows the deposit item 501, where the receiving the image 507 is based at least partially on the deposit item 501 being exposed to the remote capture device 520, as represented by the block 110 in FIG. 1; (b) automatically determine that the image is satisfactory for reading deposit item information (e.g., the deposit amount 511, etc.) from the image 507, as represented by the blocks 120-140; and (c) automatically capture, based at least partially on the determining that the image 507 is satisfactory, the image 507, as represented by block 140A. In some embodiments, the remote capture device 520 is additionally configured to send the captured image to the deposit server 530 for completing a deposit transaction, where the deposit server 530 is located remotely from the remote capture device 520, as represented by block 440 in FIG. 4. Additionally or alternatively, the deposit server 530 is configured to credit an account based at least partially on reading deposit item information from the captured image 507, as represented by blocks 650-655 shown in FIG. 6. It will be understood that, in accordance with some embodiments, the remote capture device 520 and the deposit server 530 are each configured to send and/or receive information (e.g., one or more images, messages, instructions, etc.) to and/or from each other, such that information sent from a first apparatus to a second apparatus can trigger that second apparatus to perform one or more portions of any one or more of the embodiments described and/or contemplated herein.

Referring now to FIG. 6, a mixed block and flow diagram of a system 600 is provided, in accordance with a more-detailed embodiment of the present invention. It will be understood that the system 600 is configured to credit an account based at least partially on a remotely captured image of a check. As shown, the system 600 includes a mobile phone having a digital camera 601 (e.g., the remote capture device 520 and the image capture device 528 shown in FIG. 5, etc.) and a deposit server 603 (e.g., the deposit server 630, etc.). Each of these apparatuses can include one or more communication interfaces, processors, memory devices, user interfaces, image capture devices, applications, and/or datastores, as previously described herein. In addition, in this example embodiment, the mobile phone 601 is remotely located from, but is operatively connected to (e.g., via one or more networks), the deposit server 603.

As represented by the block 605, the user of the remote capture device 601 initiates a mobile deposit application on the mobile phone and is authenticated. For example, in some embodiments, the mobile phone 601 is a specific brand of mobile phone, and the mobile deposit application is an "app" that executes on the specific brand of mobile phone for initiating, executing, completing, and/or otherwise facilitating a deposit transaction involving the mobile phone 601. In some embodiments, the mobile banking application requires the user to identify and/or authenticate himself. For example, in some embodiments, the user must provide a username/password, personal identification number (PIN), smart card, token (e.g., USB token, etc.), biometric information, and/or some other information, device, and/or credential to the remote capture device prior to that device granting the user access to the application.

After initiating the mobile deposit application, the mobile deposit application activates a video function of the digital camera, as represented by block 610. As represented by block 615, the user places the check for deposit on a flat surface, and as represented by block 620, the user holds the mobile phone over the check, such that the check is exposed to the digital camera. For example, in some embodiments, the user holds the mobile phone over the check until the digital camera is positioned orthogonally to the deposit item. As represented by block 625, while the user is holding the mobile phone over the check, the mobile phone 601 displays video of the check to the user (e.g., via a display of the mobile phone 601, etc.). In some embodiments, the video is displayed to the user in substantially real-time, such that the video is displayed to the user as the video is being generated by the digital camera. Said differently, in some embodiments, the video shows the user what the digital camera sees when the digital camera sees it.

In addition to displaying the video to the user, the mobile phone 601 automatically adjusts the focus of the digital camera as the mobile phone is being held over the check, as represented by block 630. Also while the user is holding the mobile phone 601 over the check, the mobile phone 601 automatically determines that an image of the check from the video is satisfactory (e.g., for reading information associated with the check), as represented by block 635. Further while the user is holding the mobile phone 601 over the check, and as a result of the determining that the image is satisfactory, the mobile phone 601 automatically captures the image of the check, as represented by block 640. Thereafter, as represented by block 645, the mobile phone 601 sends the captured image of the check to the deposit server 603 for completing the deposit transaction. In some embodiments, the mobile phone and/or the mobile banking application automatically sends the captured image to the deposit server 603, but in other embodiments, the mobile phone and/or the mobile banking application automatically prompt the user to send the captured image. In still other embodiments, the user sends the captured image of the check to the deposit server 603 without being prompted at all.

After receiving the captured image of the check, the deposit server 603 is configured to read the information associated with the check from the image. For example, in some embodiments, the deposit server 603 is configured to read the payee name, the payor financial institution, one or more MICR lines, and/or the written and/or numerical check amount from the image of the check. Thereafter, as represented by block 655, the deposit server 603 is configured to credit an account (e.g., a checking account held by the user, etc.) based at least partially on the check information read from the image. For example, in some embodiments where the check amount shown in the captured image is $65, the deposit server 603 is configured to deposit $65 into a checking account (e.g., that is held by the payee identified in the captured image).

Of course, the embodiment illustrated in FIG. 6 is merely exemplary and other embodiments may vary without departing from the scope and spirit of the present invention. For example, in some embodiments, the mobile phone 601 is configured to automatically prompt the user to reposition the mobile phone 601 relative to the check (and/or vice versa) if one or more of the images of the check from the video are not satisfactory for reading information from the check. In some embodiments, this automatic prompting occurs in addition to, or instead of, the mobile phone 601 automatically adjusting the digital camera of the mobile phone (e.g., by focusing on the check, zooming in on the check, etc.). As another example, in some embodiments, the mobile phone 601 is configured to automatically prompt the user to capture an image of the check when the mobile phone 601 determines that the image is satisfactory. In some embodiments, the mobile phone 601 provides one or more user input devices (e.g., touchscreen display with selectable digital buttons, keypad, etc.) that enable the user to capture the image. As another example, in some embodiments, the mobile phone 601 is configured to automatically prompt the user to input information associated with the check (e.g., the check amount, etc.) before and/or after the remote capture device automatically captures an image of the check. In addition, it will be understood that the system 600 (and/or one or more portions of the system 600) may include and/or implement any embodiment of the present invention described and/or contemplated herein.

Although many embodiments of the present invention have been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatuses and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s)

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for facilitating a remote deposit of a financial instrument using a remote mobile phone or tablet, the method comprising:
    acquiring a first image of a deposit item via a camera associated with the mobile phone or tablet;
    determining, automatically by the remote mobile phone or tablet, that the quality of the first image is not satisfactory for reading deposit item information from the first image, wherein the deposit item information is associated with the deposit item;
    displaying instructions to a user on the display of the remote mobile phone or tablet for improving the quality of the first image by manipulating at least one of the deposit item or the mobile phone or tablet;
    acquiring a second image of the deposit item via the camera associated with the mobile phone or tablet;
    determining, automatically by the mobile phone or tablet, that the quality of the second image is satisfactory for reading deposit item information from the second image in response to the user manipulating at least one of the deposit item or the mobile phone or tablet;
    storing the second image in the mobile phone or tablet; and
    sending, by the mobile phone or tablet, the second image to an apparatus located remotely from the mobile phone or tablet, wherein the apparatus is configured to credit an account based at least partly on the deposit item information shown in the second image.

2. The method of claim 1, further comprising:
    capturing, automatically by the remote mobile phone or tablet, the image of the deposit item.

3. The method of claim 1, further comprising:
    prompting, automatically by the remote mobile phone or tablet, a user of the remote mobile phone or tablet to capture the image.

4. The method of claim 1, further comprising:
    indicating, automatically by the remote mobile phone or tablet, to a user of the remote mobile phone or tablet that the image is satisfactory.

5. The method of claim 1, wherein the determining that the image is satisfactory for reading deposit item information from the image comprises:
    reading, by the remote mobile phone or tablet, at least one of a deposit amount, a payee identity, a signature, or a magnetic ink character recognition line from the image.

6. The method of claim 1, further comprising:
    adjusting, automatically by the remote mobile phone or tablet, the remote mobile phone or tablet.

7. The method of claim 1, further comprising:
    prompting, automatically by the remote capture device, a user of the remote capture device to adjust the remote mobile phone or tablet.

8. The method of claim 1, further comprising:
    prompting, automatically by the remote mobile phone or tablet, a user of the remote mobile phone or tablet to reposition the remote mobile phone or tablet or the deposit item.

9. The method of claim 1, further comprising:
    indicating, automatically by the remote mobile phone or tablet, to a user of the remote mobile phone or tablet that the image is not satisfactory.

10. The method of claim 1, further comprising:
    enhancing, automatically by the remote mobile phone or tablet, the image.

11. The method of claim 1, further comprising:
    prompting, automatically by the remote mobile phone or tablet, a user of the remote mobile phone or tablet to enhance the image.

12. The method of claim 1, wherein the deposit item comprises at least one of a check, a deposit slip, or a money order.

13. The method of claim 1, wherein the deposit item information comprises information associated with at least one of a magnetic ink character recognition line, an endorsement, a watermark, an account number, a payee identity, a payor identity, a financial institution identity, a signature, or a deposit amount.

14. The method of claim 1, wherein the acquiring the first image comprises generating a video, wherein the video comprises the first image of the deposit item.

15. The method of claim 1, wherein the storing the second image in the captured device occurs no later than approximately one minute after the generating the second image.

16. The method of claim 1, further comprising:
    determining, by the remote mobile phone or tablet, whether a magnetic ink character recognition line shown in the first image is within a predefined distance from an edge of the deposit item;
    determining, by the remote mobile phone or tablet, the orientation of the deposit item based on determining whether the MICR line is within the predefined distance;
    prompting, by the remote mobile phone or tablet, the user to change the orientation or position of the deposit item.

17. The method of claim 1, wherein the instructions comprise instructions for moving the deposit item so that it is orthogonal to the remote mobile phone or tablet.

18. The method of claim 1, further comprising:
enhancing at least a portion of the first image by creating a bi-tonal image of the portion of the first image, correcting the geometry of the portion of the first image, converting the portion of the first image to gray-scale, and creating a binarized image of the portion of the first image.

19. A remote capture device for facilitating a remote deposit of a financial instrument, the remote capture device comprising:
a mobile phone or tablet configured to acquire a first image of a deposit item via a camera associated with the mobile phone or tablet; and
a processor operatively connected to the mobile phone or tablet and configured to:
receive the first image;
automatically determine that the first image is not satisfactory for reading deposit item information from the first image, wherein the deposit item information is associated with the deposit item;
display instructions to a user on the display of the mobile phone or tablet for improving the quality of the first image by manipulating at least one of the deposit item or the mobile phone or the tablet;
acquire a second image of the deposit item via the camera associated with the mobile phone or tablet;
determine that the quality of the second image is satisfactory for reading deposit item information from the second image in response to the user manipulating at least one of the deposit item or the mobile phone or the tablet;
store the second image in the mobile phone or tablet; and
send, the second image to an apparatus located remotely from the remote capture device, wherein the apparatus is configured to credit an account based at least partly on the deposit item information shown in the second image.

20. The device of claim 19, wherein the processor is configured to automatically capture the second image of the deposit item.

21. The device of claim 19, wherein the processor is configured to automatically prompt the user of the mobile phone or tablet to capture the image.

22. The device of claim 19, wherein the processor is configured to automatically indicate to the user of the remote mobile phone or tablet that the image is satisfactory.

23. The device of claim 19, wherein the processor is configured to automatically adjust the focus or the zoom of the camera associated with the remote mobile phone or tablet.

24. The device of claim 19, wherein the processor is configured to automatically enhance the first image.

25. The device of claim 19, wherein the processor is configured to prompt the user of the remote mobile phone or tablet to reposition the remote mobile phone or tablet or the deposit item.

26. The device of claim 19, wherein the processor is configured to automatically indicate to the user of the remote mobile phone or tablet that the image is not satisfactory.

27. The device of claim 19, wherein the mobile phone or tablet acquiring the second image comprises the mobile phone or tablet generating a video, wherein the video comprises the second image of the deposit item.

28. The device of claim 19, wherein the processor storing the second image in the capture device occurs no later than approximately one minute after the mobile phone or tablet acquires the second image.

29. A computer program product for facilitating a remote deposit of a financial instrument using a remote mobile phone or tablet, the computer program product comprising a non-transitory computer-readable medium, wherein the non-transitory computer-readable medium comprises one or more computer-executable program code portions that, when executed by a remote mobile phone or tablet, cause the remote mobile phone or tablet to:
acquire a first image of a deposit item via a camera associated with the mobile phone or tablet;
automatically determine that the first image is not satisfactory for reading deposit item information from the first image, wherein the deposit item information is associated with the deposit item;
display instructions to a user on the display of the mobile phone or tablet for improving the quality of the first image by manipulating at least one of the deposit item or mobile phone or tablet;
acquire a second image of the deposit item via the camera associated with the mobile phone or tablet;
determine that the quality of the second image is satisfactory for reading deposit item information from the second image in response to the user manipulating at least one of the deposit item or the mobile phone or the tablet;
store the second image in the mobile phone or tablet; and
send, the second image to an apparatus located remotely from the remote mobile phone or tablet, wherein the apparatus is configured to credit an account based at least partly on the deposit item information shown in the second image.

30. The computer program product of claim 29, wherein the one or more computer-executable program code portions, when executed by the remote mobile phone or tablet, cause the remote mobile phone or tablet to:
automatically capture the image of the deposit item.

31. The computer program product of claim 29, wherein the one or more computer-executable program code portions, when executed by the remote mobile phone or tablet, cause the remote mobile phone or tablet to:
automatically prompt a user of the remote mobile phone or tablet to capture the image.

32. The computer program product of claim 29, wherein the one or more computer-executable program code portions, when executed by the remote mobile phone or tablet, cause the remote mobile phone or tablet to:
automatically indicate to a user of the remote mobile phone or tablet that the image is satisfactory.

33. The computer program product of claim 29, wherein the one or more computer-executable program code portions, when executed by the remote mobile phone or tablet, cause the remote mobile phone or tablet to:
acquire the second image by generating a video, wherein the video comprises the second image of the deposit item.

34. The computer program product of claim 29, wherein the one or more computer-executable program code portions, when executed by the remote mobile phone or tablet, cause the remote mobile phone or tablet to:
store the second image in the mobile phone or tablet no later than approximately one minute after receiving the image.

* * * * *